(12) United States Patent
Ashe et al.

(10) Patent No.: US 7,683,560 B2
(45) Date of Patent: Mar. 23, 2010

(54) BRUSHLESS DC PERMANENT MAGNET MOTOR

(75) Inventors: Lester B. Ashe, Fort Wayne, IN (US); Scott B. Wolf, New Haven, IN (US)

(73) Assignee: Electric Motors & Specialties, Inc., Garrett, IN (US)

( * ) Notice: Subject to any disclaimer, the term of this patent is extended or adjusted under 35 U.S.C. 154(b) by 666 days.

(21) Appl. No.: 11/536,710

(22) Filed: Sep. 29, 2006

(65) Prior Publication Data

US 2008/0079335 A1    Apr. 3, 2008

(51) Int. Cl.
*H02P 6/00* (2006.01)
(52) U.S. Cl. .............. 318/400.01; 318/459; 318/400.32
(58) Field of Classification Search ................ 318/459, 318/500, 400.01, 400.32, 400.34
See application file for complete search history.

(56) References Cited

U.S. PATENT DOCUMENTS 3,158,769 A * 11/1964 Morrill
3,697,842 A * 10/1972 Morrill
3,959,678 A *  5/1976 Donahoo
4,234,810 A * 11/1980 Donahoo
5,036,237 A *  7/1991 London
6,104,153 A *  8/2000 Codilian et al. ............. 318/362
6,570,353 B2 *  5/2003 Krotsch et al. ......... 318/400.24
2004/0131342 A1 *  7/2004 Masino ....................... 388/800
2004/0251860 A1 * 12/2004 Ehsani et al. ............... 318/254
2005/0110442 A1 *  5/2005 Trifilo ....................... 318/254

* cited by examiner

*Primary Examiner*—Rina I Duda
(74) *Attorney, Agent, or Firm*—Pearne & Gordon LLP

(57) ABSTRACT

A brushless DC motor operated by a microcontroller has a unique pole construction that enables it to reliably start and operate as a unipolar device so that a reduced number of electronic power switches can be used to reduce cost and complexity. The microcontroller calculated rotor position to eliminate the need for a separate sensor and thereby further reduce manufacturing cost.

11 Claims, 6 Drawing Sheets

BRUSHLESS DC PERMANENT MAGNET MOTOR

The invention relates to fractional horsepower motors and, particularly, to the construction of a permanent magnet brushless DC motor.

PRIOR ART

Small electric motors such as shaded pole motors can be inexpensive to produce, but have relatively low efficiency. Many applications for such motors can be significantly benefitted from a motor with increased efficiency. An example of such an application is air circulation in a refrigeration system where inefficiency is compounded by the need to remove heat generated by the motor. U.S. Pat. Nos. 3,158,769, 3,959,678, 4,234,810 and 5,036,237 disclose examples of shaded pole motors useful in commercial refrigeration systems. Conventional brushless DC motors are known to achieve relatively high efficiency but involve increased componentry and manufacturing costs.

There continues to be a need for improving the efficiency and reducing the manufacturing costs of small electric motors.

SUMMARY OF THE INVENTION

The invention relates to small electric motors constructed with a unique brushless DC drive that is both relatively high in efficiency and relatively low in cost. The disclosed motor drive circuit utilizes a microcontroller to control the delivery of current to the field windings in response to voltage signals that are inherently produced in the windings. The disclosed controller arrangement and operating mode reduces the number of power switches from what has been customary and eliminates the need for a rotor position sensor to operate the motor.

A feature of the drive circuit is a unipolar field operation that reduces the number of required power switches from what is ordinarily required and, consequently, reduces the manufacturing cost of the motor. The unipolar operation is made possible by use of a pole shape that produces an air gap that varies across the face of the pole. This air gap variation assures that a start-up position can be obtained that is off a neutral position with reference to the pole axis of the coils that are energized for start-up.

An additional benefit of the control circuit is its ability to control speed. Still further, the stator laminations as well as the stator housing body of existing prior art shaded pole motors can be used to practice the invention.

More specifically, the motor drive circuit is arranged to enable the microcontroller to monitor the back EMF of the field coils. The microcontroller is programmed to calculate the angular position of the rotor during a quarter of each revolution and this calculation, in turn, is used to regulate the dwell or angular displacement of the rotor through which power is applied to the field coils. The maximum dwell, for each phase of the poles is less than 90° of shaft rotation. The actual dwell produced by the microcontroller can be adjusted up or down to maintain a desired speed for an imposed load. The position calculator feature obviates the need for a rotor position sensing device and its attendant cost. The DC power, derived from a full bridge rectifier is applied in a unipolar arrangement wherein the poles do not change in polarity.

In summary, the overall simplicity and reduced number of components used in the disclosed motor system result in potential savings in manufacturing costs and reliability of operation.

DESCRIPTION OF THE PREFERRED EMBODIMENT

Figure 1:
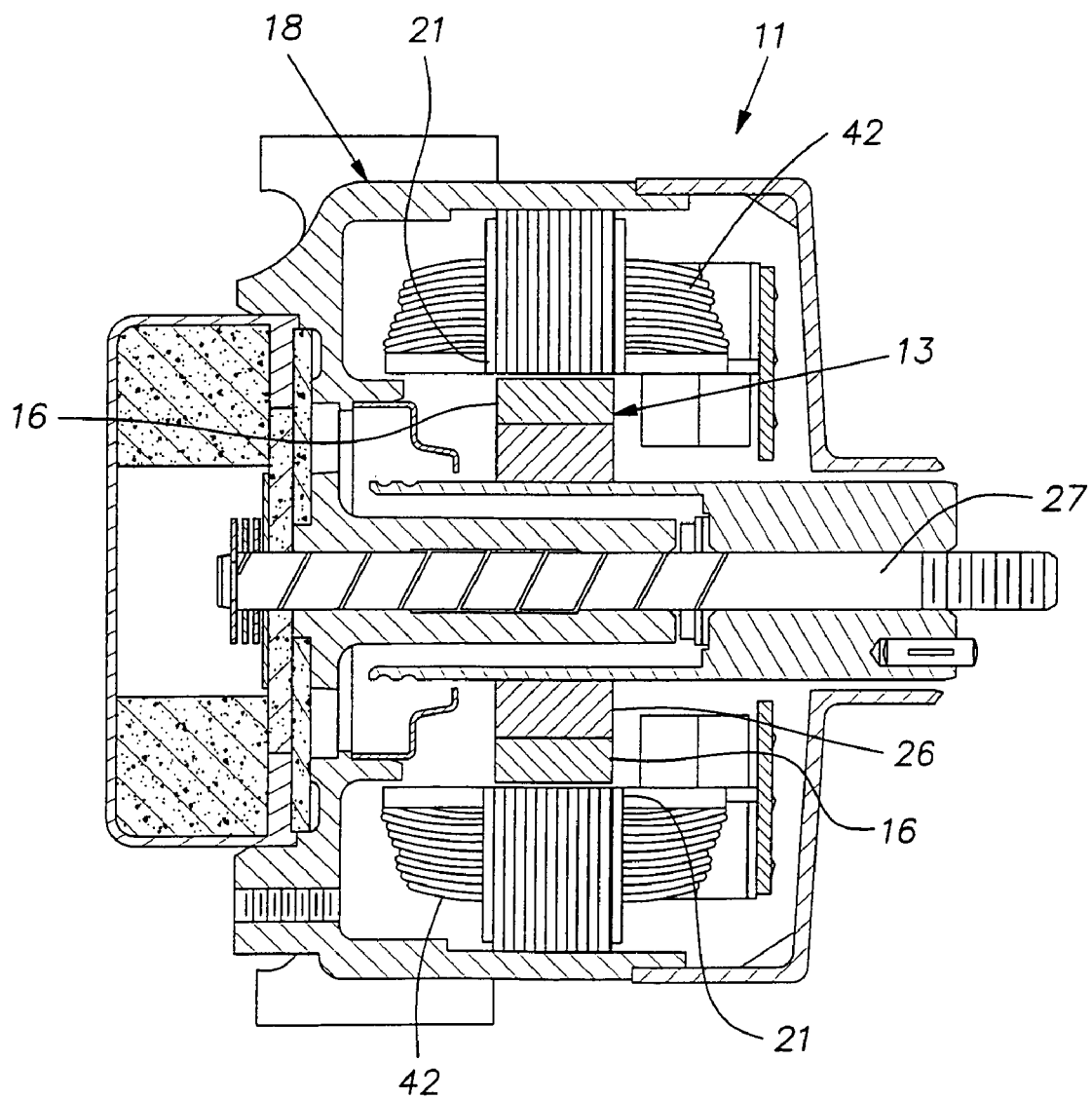
FIG. 1 is a cross-sectional view, taken in a plane on the rotor axis of a motor of the invention.
Figure 2:
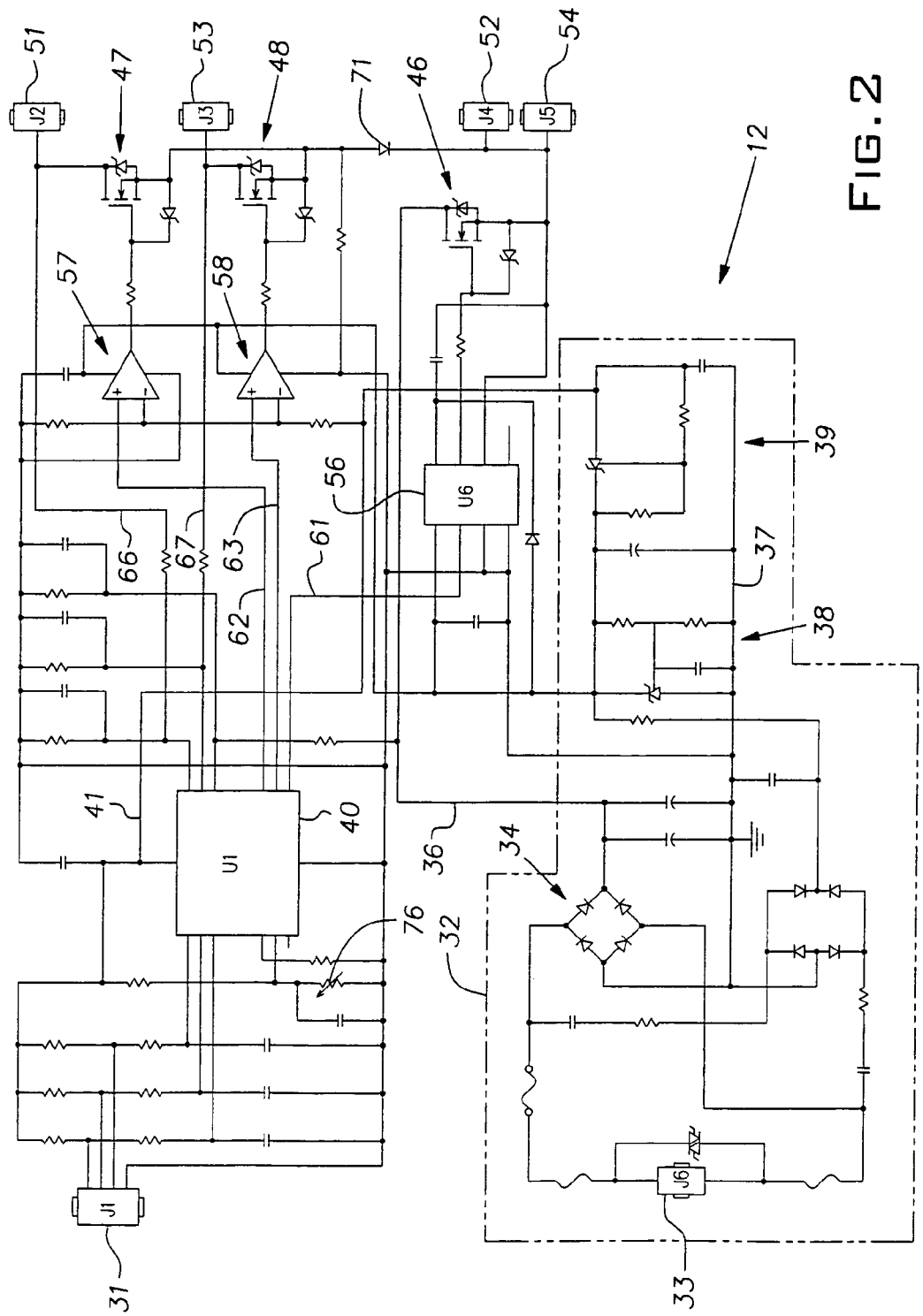
FIG. 2 is a diagram of the electrical control circuit that operates the motor.
Figure 3:
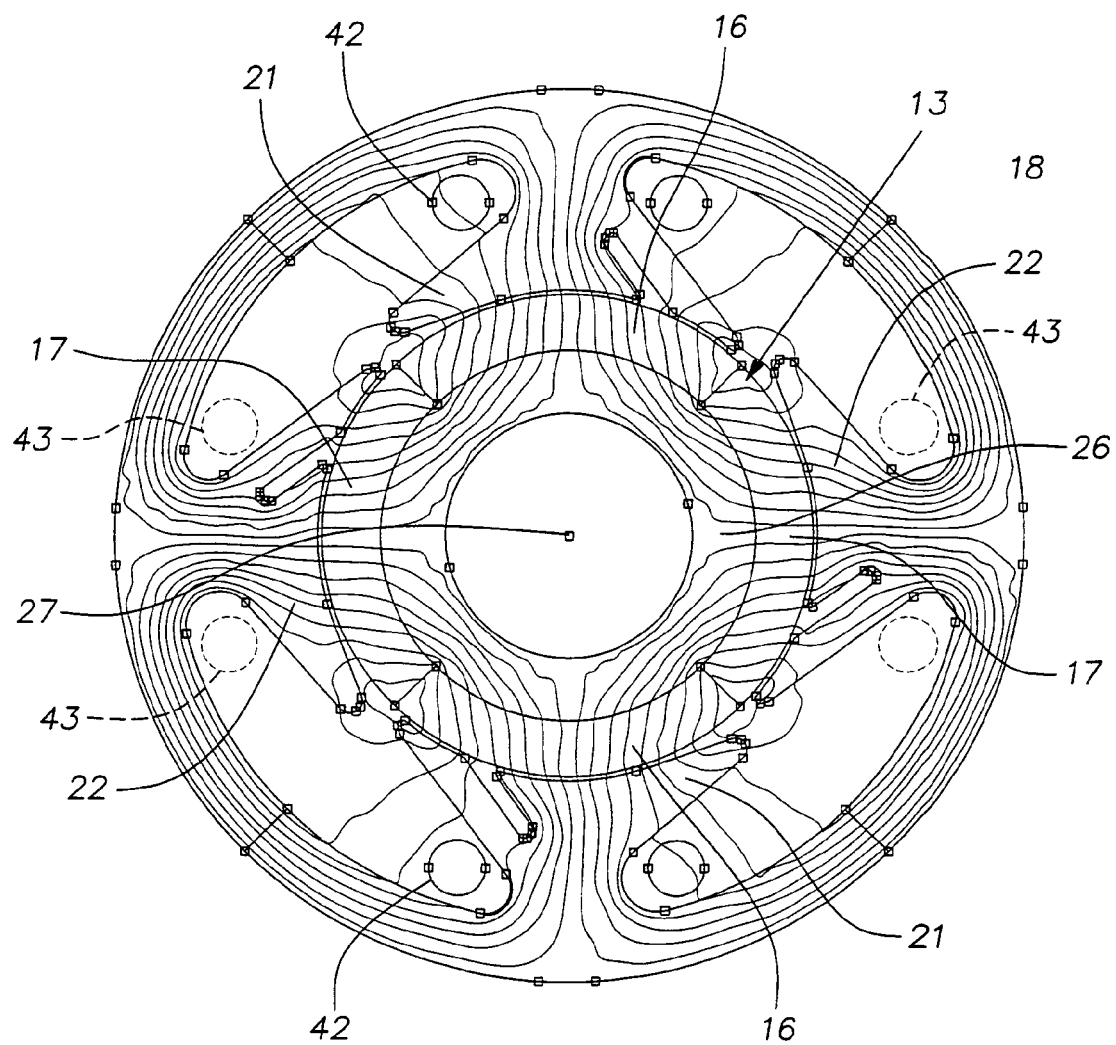
FIG. 3 is a computer simulation of the magnetic field induced in the stator by current flowing to opposed poles of one phase of the stator coils and the permanent magnets of the rotor.
Figure 4:
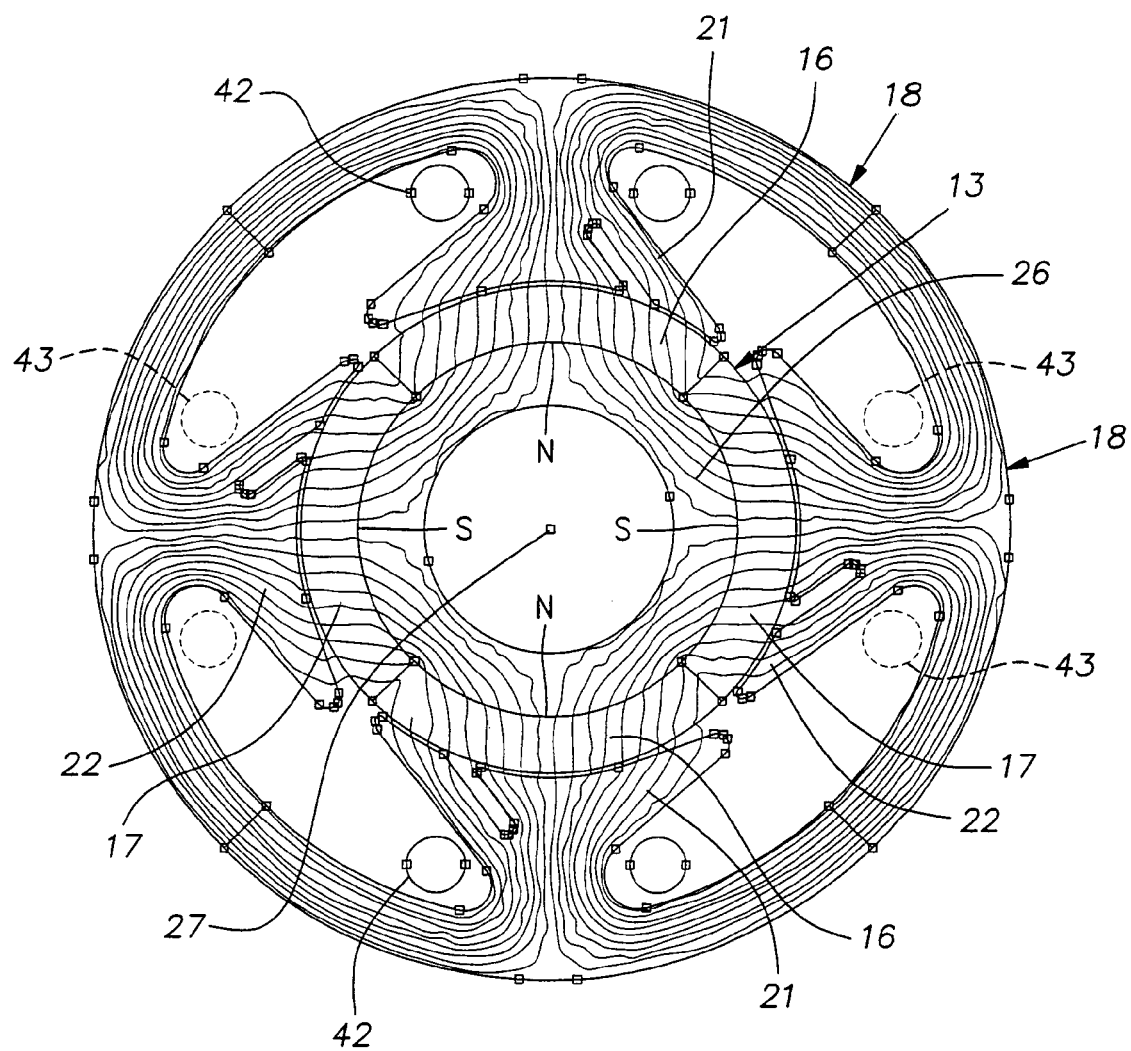
FIG. 4 is a computer simulation similar to FIG. 3 of the magnetic field induced in the stator by the permanent magnets of the rotor without electrical energization of stator coils.

A system embodying the invention comprises an electrical motor 11 (FIG. 1) operated by an electronic control circuit 12 (FIG. 2). The illustrated motor 11 is a brushless permanent magnet type operating on direct current (DC). In the illustrated case, the motor 11 has a permanent magnet rotor 13 with four magnetic poles, 16, 17, and a stator 18 with four field poles 21, 22. The four rotor permanent magnets or poles 16, 17 are bonded to a ferromagnetic round tube 26 suitably supported for rotation about a central axis 27 by a bearing such as a unit bearing known in the art. The rotor magnets 16, 17 are oriented with their north and south poles alternating circumferentially about the axis 27.

Diametrically opposite pairs of stator poles 21 or 22 are electrically wound and interconnected in a manner that when simultaneously energized with direct current, they produce magnetic fields oriented in the same direction. That is, at the inside diameter of the stator 18 when one pole 21 is North, the opposite pole 21 is also North. For purposes of explanation, one pair of opposed stator field coils are referred to as Phase 1 and the other pair are referred to as Phase 2. Referring to FIG. 2, a connector 31 is provided to receive command signals associated with a machine or appliance on which the motor 11 is installed. For example, the motor 11 can be used to drive an air circulating fan in a commercial refrigeration cabinet and the command signals can be related to the desired time and/or speed at which the motor is operated.

The circuit 12 includes a power supply generally bounded by the broken line 32. Nominal 120 volt AC voltage is supplied to a connector 33. A bridge rectifier 34 produces a nominal 160 volt supply on a positive line or "plus rail" 36. Line 37 represents a "minus rail" or ground. Local or subcircuits 38, 39 produce control voltages for the circuit 12. The power supply subcircuit 39 supplies current to a microcontroller 40 through a line 41. Current is supplied from the power supply 32 to the motor stator windings, designated 42, 43 through a "high side" MOSFET power transistor or switch 46 and alternately through one of a pair of "low side" MOSFET switches 47, 48. One of the alternate low side MOSFET transistors 47 controls current in one set of field coils 42 arbitrarily labeled Phase 1 and the other MOSFET switch 48 controls current through the other stator field coils or windings 43, arbitrarily called Phase 2. The field windings or coils 42 are connected across solder pads or terminals 51, 52 while, similarly, the other field windings or coils 43 of Phase 2 are connected across solder pads or terminals 53, 54. A driver 56 interfaces, via line 61, between the microcontroller 40 and high side MOSFET or switch 46 and separate operational amplifiers 57, 58 interface between the microcontroller 40 and an associated low side MOSFET power transistor or switch 47, 48 through the lines 62, 63, respectively.

A study of the circuit 12 shows that the microcontroller or microprocessor 40 is arranged to selectively control current delivery to the stator field coils 42, 43. Feedback lines 66, 67 allow the microcontroller 40 to monitor the back EMF produced in the respective stator coils 42, 43. The microcontroller 40 is programmed with a routine for starting the motor 11 and then a routine for operating it at a desired speed. As mentioned, the term Phase 1 is associated with one set of opposed stator poles 21 and the term Phase 2 is associated with the other set of poles 22.

Figure 6:
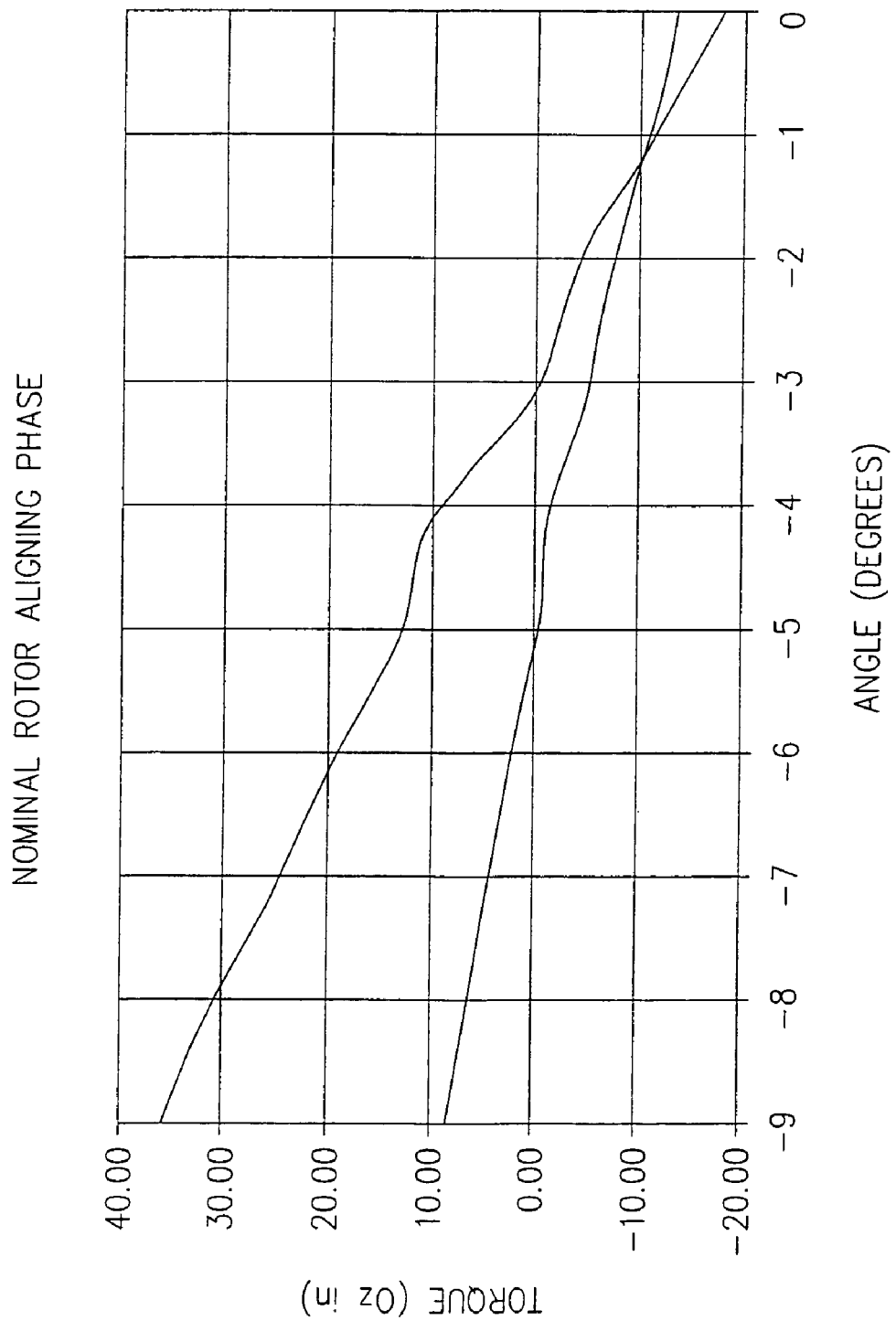
FIG. 6 is a graph showing the torque developed on the rotor when one phase of the field coils is energized and when it is not energized.

The poles 21, 22 of each Phase 1 and 2 are symmetrical with one another and are such they are physically displaced from the poles of the other phase by 90°. The illustrated stator pole geometry is characterized by an air gap that varies circumferentially of the rotor, i.e. in an angular direction with reference to the axis 27 across the face of a pole 21, 22. This geometry produces two stable rotor positions slightly but distinctly displaced from one another corresponding to whether or not a set of opposed poles of a phase is electrically energized. The microcontroller 40 uses this phenomena to reliably start the motor in a consistent direction. In a first step in the starting sequence, the microcontroller 40 energizes a pair of poles, say those of Phase 1. Thereafter, the microcontroller 40 de-energizes this pair as well as the other pair of poles (Phase 2). As indicated in FIG. 6, the stator will tend to align with the energized phase poles where the torque is 0, i.e. −3° from a reference point where 0 is taken as the nominal geometric center of the opposed poles. The microcontroller 40 then re-energizes the pole coils (Phase 1) while Phase 2 remains de-energized. The rotor shifts from the energized Phase 1 angular rest position of 0 torque to a rest or stable position of 0 torque indicated at −5°. This position sets the stage for energization of the Phase 2 coils 43. The microcontroller 40 then energizes the Phase 2 coils which rotate the rotor in a consistent known direction since the rotor 13 is off center of the Phase 1 coils consistently to the same direction at start-up as a result of the alignment step. Since the Phase 2 coils are displaced 90° from the Phase 1 coils, the rotor 13, once it moves off of alignment with the Phase 1 coils, is out of a potential dead spot that exists when centered on the neutral or zero torque position of Phase 1 and, likewise, not being in this neutral position is not capable of rotation in an unwanted direction. The microcontroller 40 energizes the Phase 2 coils 43 to start rotation of the rotor 13. Thereafter, the microcontroller 40 alternately energizes Phase 1 and Phase 2 coils to maintain rotation of the rotor.

Figure 5:
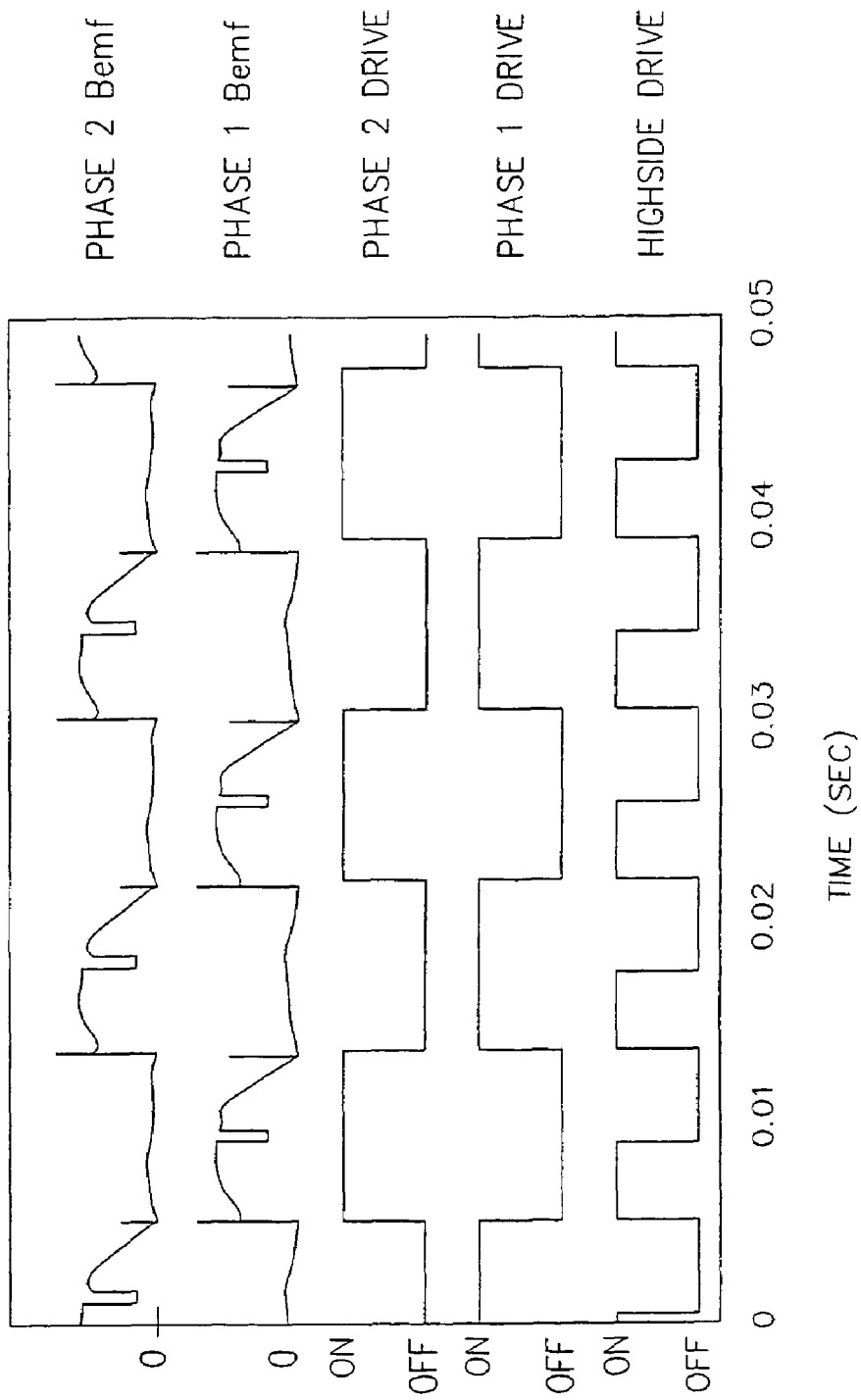
FIG. 5 is a graph schematically showing stator coil feedback and control signals existing in operation of the motor and control circuit.

Reference is made to FIG. 5. The microcontroller 40 operates with the following strategy. Coils of only one phase, Phase 1 or Phase 2, are energized at one time. When the back EMF, as signaled to the microcontroller 40 through one of the lines 66, 67 of the coils 42, 43 of a phase not energized reaches 0 that phase is energized by the microcontroller through the line 63 or 62 activating the associated MOSFET transistor 48 or 47.

The coils of an energized phase are de-energized by the microcontroller 40 before the rotor turns 90° from when it is energized. The position of the rotor 13 after a phase is energized is calculated by the microcontroller 40 by integrating the back EMF signal, which signal is proportional to rotor speed, of the non-energized phase. The microcontroller 40 determines how long an energized set of stator coils remains turned on as a portion of a one-quarter revolution of the rotor (e.g. represented as a set point limiting the integral of the back EMF so that power is always extinguished before full 90° of rotation) to apply enough average power over an extended time so that the motor will run at a desired speed. The microcontroller can measure speed, for example, by measuring the time between instants when the back EMF goes to 0 at the same or alternate phases.

The duration of the angle of rotation that current is applied to the individual stator coils by the microcontroller 40 can be increased to increase the average speed, or reduced to lower the average speed. The microcontroller is preferably programmed to limit the rate of change of the time power is applied to minimize over or under shoot.

Current to either phase is extinguished by the microcontroller 40 at the appropriate time, this being determined by calculating the angular position of the rotor, by shutting off the high side MOSFET drive transistor 46. This allows the field energy to dissipate in the respective stator coil 42, 43 through a freewheeling diode 71.

The microcontroller 40 can be programmed to detect locked rotor conditions and when such a condition exists the microcontroller places the motor 11 in a low power mode while periodically trying to start the motor. A thermistor 76, appropriately positioned relative to the motor 11 can be provided to work with a subroutine in the microprocessor program to detect excessive temperature and place the motor in a low power mode where it will start and run periodically but will not continue to run unless the excessive load or abnormal condition is removed.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A brushless DC motor system comprising a motor and a drive circuit, the motor having a stator and a rotor, the rotor being supported for rotation about an axis, the stator having a plurality of field poles including coils distributed about the rotor axis, the rotor having a permanent magnet arranged to interact with the field poles, the drive circuit including a microcontroller, conductors for communicating the back EMF in the field coils to the microcontroller, an electronic switch associated with each field coil for controlling DC current through the associated coil, the drive circuit including elements enabling the microcontroller to selectively operate the switches, the microcontroller being programmed to monitor the back EMF of the coils, determine the approximate angular position of the rotor from the back EMF data, and operate the electronic switches at appropriate times in successive revolutions of the rotor on the basis of its determination of the approximate rotor position.

2. A motor system as set forth in claim 1, wherein said coils and drive circuit operate the motor as a unipolar device.

3. A motor system as set forth in claim 1, wherein the microcontroller is programmed to control the speed of the motor.

4. A motor system as set forth in claim 3, wherein the microcontroller controls the motor by regulating the length of time that current is applied to a first coil by integrating the back EMF of the second coil and thereby calculating the angular position of the rotor, the length of time that current is applied to a coil being less than it takes for the rotor to pass between separate coils.

5. A motor system as set forth in claim 4, wherein the speed of the motor is controlled by the microcontroller by monitoring and adjusting the time between energization of successive coils.

6. A motor system as set forth in claim 2, the construction of the rotor and stator being arranged so that the poles align the rotor to the stator at a first stable angular position when no current is applied to the coils and a second stable angular position when current is applied to the coils.

7. A motor system as set forth in claim 6, wherein the poles of the stator and rotor have an air gap that varies circumferentially.

8. A brushless DC motor system comprising a motor and a drive circuit, the motor having a stator and a rotor, the rotor being supported for rotation about an axis, the stator having a plurality of field poles including coils distributed about the rotor axis and arranged in only two phases, the rotor having a permanent magnet arranged to interact with the field poles, the drive circuit being arranged to operate the poles in a unipolar manner and including an electronic power switch associated with each field coil phase for controlling DC current through the associated coil, the drive circuit including elements to selectively operate the switches at appropriate times in successive revolutions of the rotor.

9. A motor system as set forth in claim 8, wherein said drive circuit is limited to three electronic power switches for controlling field current.

10. A motor system as set forth in claim 8, the construction of the rotor and stator being arranged so that the poles align the rotor to the stator at a first stable angular position when no current is applied to the coils and a second stable angular position when current is applied to the coils.

11. A motor system as set forth in claim 10, wherein the poles of the stator and rotor have an air gap that varies circumferentially.

* * * * *